C. NIEDERGANG, F. P. STENGER AND T. J. FREY.
GAS AND AIR MIXER.
APPLICATION FILED OCT. 27, 1919.
1,367,201.
Patented Feb. 1, 1921.
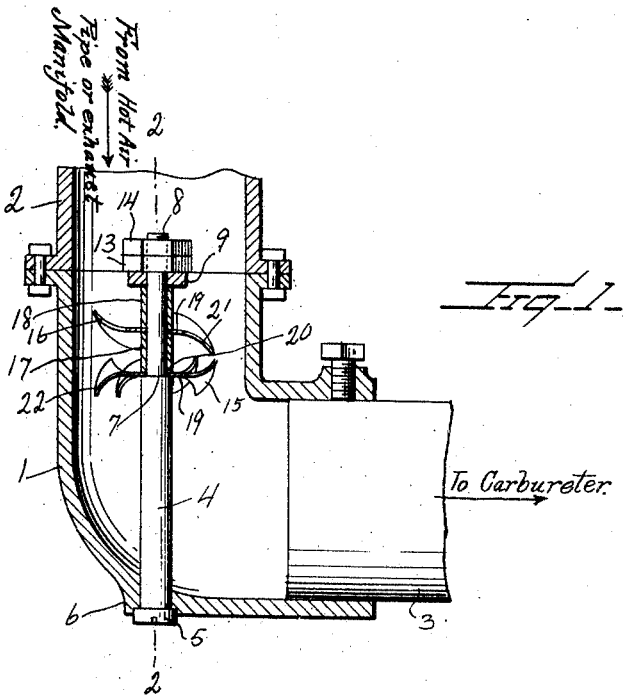
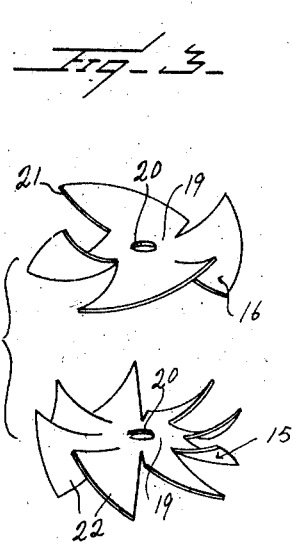
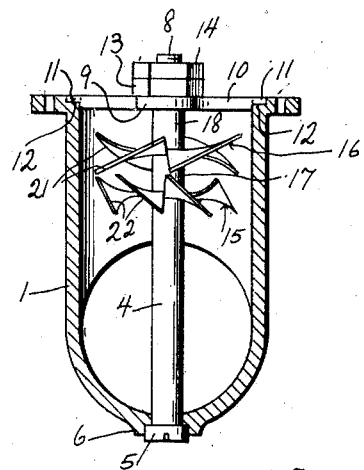
Inventors
F. P. Stenger,
C. Niedergang and
T. J. Frey.
By Watson E. Coleman
Attorney.

UNITED STATES PATENT OFFICE.

CHARLES NIEDERGANG, FERDINAND PHILIP STENGER, AND THEODORE JOHN FREY, OF CINCINNATI, OHIO.

GAS AND AIR MIXER.

1,367,201.  Specification of Letters Patent.  Patented Feb. 1, 1921.

Application filed October 27, 1919. Serial No. 333,797.

*To all whom it may concern:*

Be it known that we, CHARLES NIEDERGANG, FERDINAND P. STENGER, and THEODORE JOHN FREY, citizens of the United States, residing at Cincinnati, in the county of Hamilton and State of Ohio, have invented certain new and useful Improvements in Gas and Air Mixers, of which the following is a specification, reference being had to the accompanying drawings.

This invention relates to an improved agitator adapted for connection in the hot air pipe of the exhaust manifold to a carbureter for thoroughly agitating the air so as to meet the fuel which passes into the carbureter to insure a better mixture to be drawn into the intake manifold.

One of the objects of the invention is the provision of a device of this kind to insure more mileage and power from each gallon of gasolene and furthermore to lessen carbon and machine trouble.

Another object of the invention is to lessen the gas consumption and also to insure better motor service.

A further object of the invention is to provide an agitator comprising a pair of revoluble members mounted upon a spindle in an insert section between the hot air pipe of the exhaust manifold to a carbureter and adapted for rotation in opposite directions at relatively different speeds, thereby insuring a thorough agitation of the hot air, to insure a better mixture in the carbureter.

A still further object of the invention is the provision of a pair of revoluble members having a different number of blades, the blades of one member being pitched at opposite angles to the blades of the other member, the blades of both members being of relatively different pitches, even though they are at opposite angles thereby further insuring a thorough agitation of the hot air.

By virtue of one of the members rotating in one direction, creating air currents which cut across the air currents of the other member, insures a thorough agitation of hot air to enter the carbureter.

While the design and construction at present set forth and illustrated is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a sectional view through a portion of the conduit leading from the hot air pipe of the exhaust manifold to a carbureter, illustrating a casing connecting the two conduits and showing the agitating device as applied;

Fig. 2 is a vertical sectional view on the line 2—2 of Fig. 1; and

Fig. 3 discloses collective views of the revoluble agitating devices, showing the different number of blades and illustrating their different pitches.

Referring to the drawings, 1 designates a casing, which may be of any suitable shape, preferably L-shaped and which connects between the hot air pipe 2 and the conduit 3 from the carbureter. Mounted in the casing 1 is a spindle 4, the lower end of which has a head 5 which is countersunk in a boss 6 of the lower part of the casing. The spindle 4 is positioned as shown, though not necessarily, and near its upper portion it is provided with a shoulder 7. Formed integrally with the spindle and extending beyond a shoulder is a reduced extension 8 which is mounted in a bearing 9 of the transversely disposed bar 10. The end portions of this bar have reduced parts 11, which engage recesses 12, which are diametrically disposed and are formed on the upper marginal edge of one end of the casing 1.

A securing nut 13 is threaded to the reduced extension 8 of the spindle, there being a lock nut 14 also threaded upon the extension to secure the nut 13 in place. Revoluble hot air agitating elements 15 and 16 are mounted upon the reduced extension 8 of the spindle, there being sleeves or collars 17 and 18 on the extension to hold the elements spaced. The sleeve 17 is interposed between the elements 15 and 16 while the sleeve or collar 18 is arranged above the element 16 and below the transversely disposed bar 10. The sleeves or collars are of such lengths as to permit free revoluble movements of the elements.

The agitating elements each comprise a hub 19 having a central opening 20 through which the reduced extension passes so that the element may freely rotate as the air is drawn through the hot air pipe. The agitating element 16 is provided with a plurality of radial blades 21, preferably four in number, though not necessarily, and these blades are pitched at angles shown. The agitating element 15 is provided with a plurality of radial blades 22, preferably eight in number, though not necessarily. The blades 22 of the element 15 are disposed at angles just the opposite to the angles of the blades 21 of the agitating elements 16, and even though they are positioned at opposite angles, their pitches are relatively different to those of the blades 21 of the other element 16. By disposing the blades at opposite angles, it will be noted that the air as it is drawn from the hot air pipe of the exhaust manifold imparts movement to the elements in opposite directions and owing to the blades being at relatively different pitches, the air is thoroughly agitated for use in the carbureter, thereby insuring a better mixture of the charge of air and gasolene in the carbureter. The velocity of the agitating elements depends upon the speed of the motor, and this controls the hot air from the hot air pipe into the carbureter for gas mixing purposes in the carbureter. After the agitating elements are put in motion a suction is created in the insert casing, thereby acting to draw the hot air from the hot air pipe of the exhaust manifold. As the hot air increases under the increased speed of the motor, greater the velocity of the agitating elements which thoroughly agitates the hot air for use in the carbureter.

If it should be so desired this present form of agitator could be used as a mixer for the air and gas, by coupling it between the carbureter and the intake manifold, so as to thoroughly mix and vaporize the charge.

The invention having been set forth, what is claimed as new and useful is:—

In an article of manufacture, the combination with a casing, of a spindle mounted therein, a plurality of elements rotatably mounted on the spindle and having radial blades, the blades of one element being greater in number than the blades of the other element and being disposed at relatively different pitches whereby as the mixed gases are drawn through the casing, the elements are rotated at relatively different speeds.

In testimony whereof we hereunto affix our signatures.

CHARLES NIEDERGANG.
FERDINAND PHILIP STENGER.
THEODORE JOHN FREY.